April 6, 1965  E. R. DE VRIES ETAL  3,176,584
REFLEX REFLECTIVE SHEETING AND METHOD OF MAKING SAME
Filed Oct. 11, 1961

INVENTORS
Eduard R. deVries &
William H. Riley, Jr.

BY  Karl W. Flocks
ATTORNEY

United States Patent Office 3,176,584
Patented Apr. 6, 1965

3,176,584
REFLEX REFLECTIVE SHEETING AND METHOD OF MAKING SAME
Eduard R. de Vries, Huntingdon, and William H. Riley, Jr., Altoona, Pa., assignors to Prismo Safety Corporation, Huntingdon, Pa., a corporation of Pennsylvania
Filed Oct. 11, 1961, Ser. No. 144,427
12 Claims. (Cl. 88—82)

The present invention relates to a reflective sheeting and more particularly to a reflex light reflecting sheet material and to a method for preparing it.

Heretofore several different forms of reflective sheeting have been proposed which include a light-returning layer of small transparent beads or spheres partially embedded in a bonding layer with a light reflecting means being located behind the beads. Such sheets have the property of reflecting back a brilliant cone of light toward the source of an angularly incident ray, and have been called reflex reflectors. Such reflectors are to be distinguished from specular reflectors, such as mirrors, which cause reflection of the incident light in all directions without selective return in the direction of incidence.

Reflex reflecting sheets are used in making signs and markers which have great night time visibility.

It is an object of the present invention to provide an improved method of manufacture of a reflex light reflecting sheeting.

It is a further object of the present invention to provide an improved form of reflex light reflecting sheeting.

Other objects and the nature and advantages of the invention will be apparent from the following description taken in conjunction with the accompanying drawings, wherein.

Figure 1:
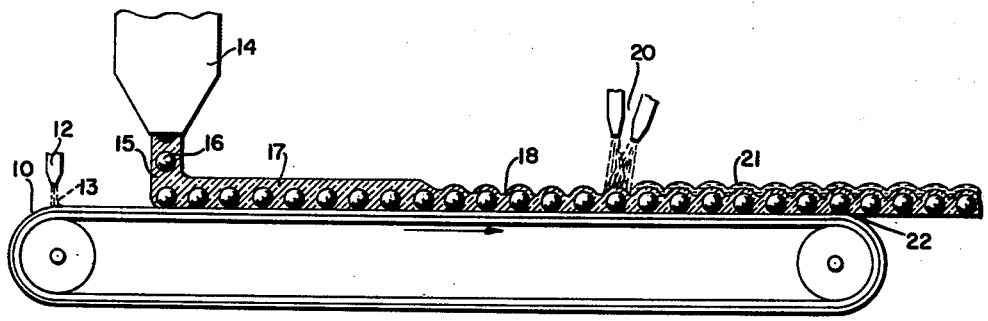
FIG. 1 is a diagrammatic sectional view showing the apparatus and process of the present invention.
Figure 2:
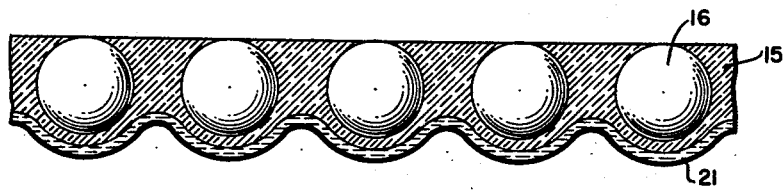
FIG. 2 is an enlarged sectional view of the sheeting of the present invention.
Figure 3:
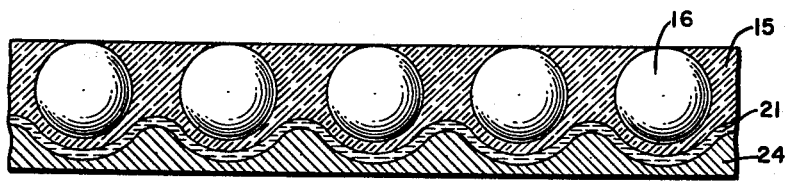
FIG. 3 is an enlarged sectional view of the sheeting of FIG. 2 with a reinforcing layer next to the reflecting layer.
Figure 4:
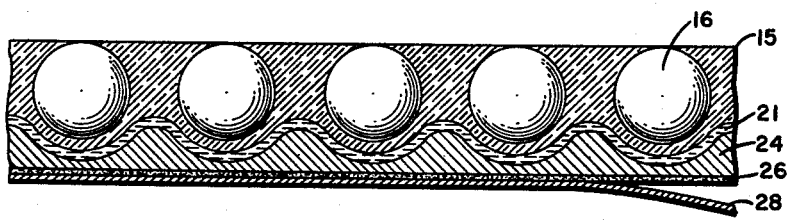
FIG. 4 is an enlarged sectional view of the sheeting of FIG. 3 with an adhesive layer and a removable liner thereon.

Referring to the drawings, FIG. 1 shows diagrammatically the method and apparatus of the present invention. A continuous flat steel belt 10 is provided which is driven by sprockets at a constant speed in the form of an endless belt. The upper surface of the belt is sprayed at 12 with a silicone material 13 to render the surface adherent. At 14 a premix of a transparent binder material 15 and small transparent glass spheres 16 having the desired index of refraction is sprayed onto the belt. The amount sprayed is so controlled that a monolayer of glass beads embedded completely in the transparent binder material is obtained as shown at 17.

The binder material will cure as it travels along on the belt shrinking somewhat as it cures. During the curing period, the glass spheres will come to rest on the belt in point contact therewith and the shrinkage of the binder during curing and capillary action will result in the layer of binder on top of the beads assuming the curved configuration of the tops of beads as shown at 18. A heating means may be provided above the moving sheeting for speeding up the solidification of the binder material.

When the sheeting has hardened on the belt, a reflective coating is next formed on the upper curved surfaces of the sheeting. This can be accomplished in various ways, such as by a 2-component spray gun 20 which applies a thin silver coating 21 on the sheet. When the sheeting has dried, it is continuously peeled off from the adherent coating on the belt as shown at 22.

If desired, a reinforcing layer 24 of resin can be applied onto the reflective coating by spraying prior to removal from the belt. For certain purposes, a removable liner is desirable and this can be obtained by applying an adhesive coating 26 onto the reinforcing layer 24, which is covered over by a removable liner sheet 28. The adhesive coating 26 should be waterproof for sheeting intended for outdoor use. It may be of a solvent-activatable type, or of a heat-activatable type, or one which may be activated to adhesiveness either by use of a solvent or use of heat. Such adhesives are normally non-tacky and require activation at the time of use to produce the desired adhesion or bonding to the base surface to which the sheeting is applied, as in making up a sign. A pressure-sensitive adhesive coating may be used, which is normally tacky and adheres to a surface against which it is pressed without need of activation. The removable liner protects the exposed back surface of the adhesive coating, and allows the sheeting to be wound in roll form without any danger of the adhesive material coming in contact with the upper surface of the sheeting. The liner can be of any of the well known types such as Holland cloth, regenerated cellulose or the like which can be readily peeled away from the adhesive surface.

The binder material 15 can be made of any suitable transparent resin, such as methyl methacrylate, flexible epoxy resins, chloro sulfonated polyethylene, polystyrene, polypropylene, polycarbonate resin, ethyl cellulose, cellulose acetate-butyrate and the like. Generally, any clear, weather resistant polymer can be used which will cure or harden in the time permitted with some shrinkage while traveling on the belt.

Instead of spraying the premix of binder and glass spheres, any other suitable method of obtaining a unilayer of glass spheres embedded in the binder can be used. For example, an extruder could be used for extruding the premix or a mechanical device of rollers can be substituted.

The spheres are preferably of glass, however, any suitable hard transparent solid material can be used having the desired index of refraction and size. The spheres should have a diameter not exceeding about 40 mils, but preferably the spheres should have an average diameter not exceeding about 10 mils. Excellent results are obtained by using spheres having an average diameter in the range of 3 to 6 mils.

The method of depositing the reflective coating on the sheeting may be varied as desired. Many methods have been proposed for metallizing plastic surfaces and any of these may be used. Instead of the 2-component system where silver is immediately formed, as illustrated, aluminum may be deposited by vacuum or aluminum paint or other reflecting paints may be used.

The reflecting coat is thin and assumes the curved shape of the binder material, thus giving a curved reflecting surface behind each sphere. Such a system yields much better reflection than in previously proposed sheeting which uses a flat reflector sheet.

The thin layer of transparent binder between the spheres and the reflecting layer acts as a spacing film for obtaining the optimum reflection. The thickness of the spacing film can be controlled and made of the proper thickness depending upon the index of refraction of the glass spheres used and their diameter. Good results have been obtained with glass spheres having an index of refraction of 1.92–2.00 and an average diameter of 3–6 mils.

The sheeting made in accordance with the present invention has several distinct advantages over the previously proposed reflex reflecting sheeting. First of all it yields a flat top due to the contact with the steel belt, and the glass spheres are all in point contact with the upper surface of the sheeting. The thickness of the spacing film or layer between the sphere and the reflecting coating is uniform and can be controlled as desired, and the reflective coat is curved behind each sphere for better reflection. The method is a simple continuous method of manufacture.

It should be understood that the transparent binder material 15 may be of any desired color as is conventional in the art.

It will be obvious to those skilled in the art that various changes may be made without departing from the spirit of the invention and therefore the invention is not limited to what is shown in the drawings and described in the specification, but only as indicated in the appended claims.

What is claimed is:

1. A method of making reflex reflective sheeting which comprises forming on a flat surface a layer of a premix of a transparent binder material and small transparent glass spheres, said spheres being completely embedded in said layer, said layer being of such a thickness as to yield a monolayer of said spheres in said binder, said spheres having an average diameter in the range of 3–40 mils, said binder being a substance capable of hardening with some shrinkage so that the spacing layer of binder over the spheres when hardened assumes the curvature of the upper surfaces of the spheres, applying a thin reflective coating onto the upper surface of said spacing layer of binder, and stripping said sheeting from said surface to yield a flat stripped surface having the spheres in approximate point contact therewith and whereby the reflective coating on the opposite side of the spheres assumes the curvature of the surface of the spheres and is evenly spaced from said spheres by a layer of said transparent binder.

2. The method of claim 1, wherein a reinforcing layer of binder material is applied onto the solidified reflective coating layer to yield a flat outer surface thereon.

3. The method of claim 2, wherein an adhesive coating is applied onto the reinforcing layer.

4. A method of making reflex reflective sheeting which comprises spraying a premix of a transparent binder material and small transparent glass spheres onto a flat moving belt so as to form a layer of said binder material with a monolayer of said spheres completely embedded therein, said spheres having a diameter in the range of 3–40 mils, said binder being a substance capable of hardening with some shrinkage so that the spacing layer of binder over the spheres when hardened assumes the curvature of the upper surfaces of the spheres but the lower surface of the binder conforms to the flat belt, applying a thin metallic reflective coating onto the upper surface of said spacing layer of binder, whereby the reflective coating assumes the curvature of the upper surface of the spheres and is evenly spaced from said spheres by a layer of said transparent binder material and stripping said sheeting from said surface.

5. A method in accordance with claim 4, wherein said belt is provided with an adherent coating to permit ready release of said sheeting therefrom during the stripping step.

6. The method of claim 4, wherein a reinforcing layer of binder material is applied onto the solidified reflective coating layer to yield a flat outer surface thereon.

7. The method of claim 6 wherein an adhesive coating is applied onto the reinforcing layer.

8. A method in accordance with claim 1, wherein said layer of binder and glass spheres is formed by extruding a premix of said binder and spheres onto said surface.

9. A reflex reflective sheeting comprising a layer of a transparent binder material having a monolayer of small transparent glass spheres completely embedded therein, one surface of said layer being flat and having the spheres in point contact therewith, the other surface of said layer assuming the curved configurations of the surfaces of said spheres, and a thin reflecting coat on the other surface of said layer, said reflecting coat having the curved configuration of said other surface and being evenly spaced by said transparent binder from said spheres.

10. Reflex reflective sheeting in accordance with claim 9 having a reinforcing layer of binder material in contact with said reflecting coat to yield a flat other surface to said sheeting.

11. Reflex reflective sheeting in accordance with claim 10 having an adhesive coating in contact with said flat reinforcing layer surface.

12. Reflex reflective sheeting in accordance with claim 11 having a removable liner sheet in contact with said adhesive coating.

References Cited by the Examiner

UNITED STATES PATENTS

| 2,543,800 | 3/51 | Palmquist et al. | 41—22 XR |
| 2,706,262 | 4/55 | Barnes | 117—70 XR |
| 3,069,728 | 12/62 | Mindick et al. | 156—246 XR |

EARL M. BERGERT, *Primary Examiner.*

ALEXANDER WYMAN, JACOB STEINBERG,
*Examiners.*